(12) United States Patent
Zebuhr

(10) Patent No.: US 6,908,533 B2
(45) Date of Patent: *Jun. 21, 2005

(54) ROTATING HEAT EXCHANGER

(75) Inventor: William H. Zebuhr, Nashua, NH (US)

(73) Assignee: Ovation Products Corporation, Nashua, NH (US)

(*) Notice: Subject to any disclaimer, the term of this patent is extended or adjusted under 35 U.S.C. 154(b) by 459 days.

This patent is subject to a terminal disclaimer.

(21) Appl. No.: 10/051,901

(22) Filed: Jan. 17, 2002

(65) Prior Publication Data

US 2003/0132096 A1 Jul. 17, 2003

(51) Int. Cl.$^7$ .............................. B01D 3/08; B01D 3/14
(52) U.S. Cl. ...................... 202/172; 159/6.1; 159/24.1; 159/28.6; 202/182; 202/186; 202/238; 165/167
(58) Field of Search .............................. 202/182, 155, 202/172–174, 238, 269, 186; 159/6.1, 17.1, 24.1, 28.6, 43.1, DIG. 8, 14–15; 165/165–167, 88, 115

(56) References Cited

U.S. PATENT DOCUMENTS

| | | | |
|---|---|---|---|
| 2,703,310 A | 3/1955 | Kretchmar | |
| 2,894,879 A | 7/1959 | Hickman | |
| 2,899,366 A | 8/1959 | Hickman | |
| 2,953,110 A | * 9/1960 | Etheridge | 29/890.03 |
| 3,310,105 A | * 3/1967 | Butt | 165/166 |
| 3,568,766 A | 3/1971 | Thomas et al. | |
| 3,764,483 A | 10/1973 | Tleimat | |
| 3,840,070 A | * 10/1974 | Becker et al. | 165/167 |
| 3,890,205 A | 6/1975 | Schnitzer | |
| 4,125,946 A | 11/1978 | Prager | |
| 4,129,014 A | 12/1978 | Chubb | |
| 4,235,679 A | 11/1980 | Swaidan | |
| 4,267,021 A | 5/1981 | Speros et al. | |
| 4,402,793 A | 9/1983 | Petrek et al. | |
| 4,504,361 A | 3/1985 | Tkac et al. | |
| 4,585,523 A | 4/1986 | Giddings | |
| 4,586,985 A | 5/1986 | Ciocca et al. | |
| 4,671,856 A | 6/1987 | Sears | 203/22 |
| 4,707,220 A | 11/1987 | Feres | |
| 4,731,159 A | * 3/1988 | Porter et al. | 159/6.1 |
| 4,822,455 A | 4/1989 | Olrik | |
| 5,045,155 A | 9/1991 | Ramsland | |
| 5,232,557 A | * 8/1993 | Kontu et al. | 202/182 |
| 5,409,576 A | 4/1995 | Tleimat | |
| 5,411,640 A | 5/1995 | Ramsland | |
| 5,628,879 A | 5/1997 | Woodruff | |
| 5,810,975 A | 9/1998 | Bourdel et al. | |
| 5,927,383 A | 7/1999 | Ramm-Schmidt et al. | |

(Continued)

FOREIGN PATENT DOCUMENTS

| | | |
|---|---|---|
| GB | 757085 | 9/1956 |
| WO | WO 35551 | 6/2000 |
| WO | WO 35552 | 6/2000 |

OTHER PUBLICATIONS

PCT Notification of Transmittal of the International search Report or the Declaration, Form PCT/ISA/220 (Apr. 2002).

*Primary Examiner*—Virginia Manoharan
(74) *Attorney, Agent, or Firm*—Foley Hoag LLP

(57) ABSTRACT

An evaporator and condenser unit for use in distilling a liquid, such as water, includes a rotary heat exchanger plate having a plurality of folds or pleats. Adjacent panels of the folded plate define spaces between their oppositely facing surfaces, and these spaces are alternatingly configured as evaporating and condensing chambers. The evaporating chambers, moreover, are defined between adjacent panels that are joined at an outer diameter fold, while the condensing chambers are defined between adjacent panels that are joined at an inner diameter fold. The evaporating chambers are thus closed at their outer diameter ends and open at their inner diameter ends, while the condensing chambers are closed at their inner diameter ends and open at their outer diameter ends.

11 Claims, 9 Drawing Sheets

U.S. PATENT DOCUMENTS 5,968,321 A * 10/1999 Sears .................... 202/172
6,238,524 B1   5/2001 Zebuhr
6,261,419 B1   7/2001 Zebuhr

* cited by examiner

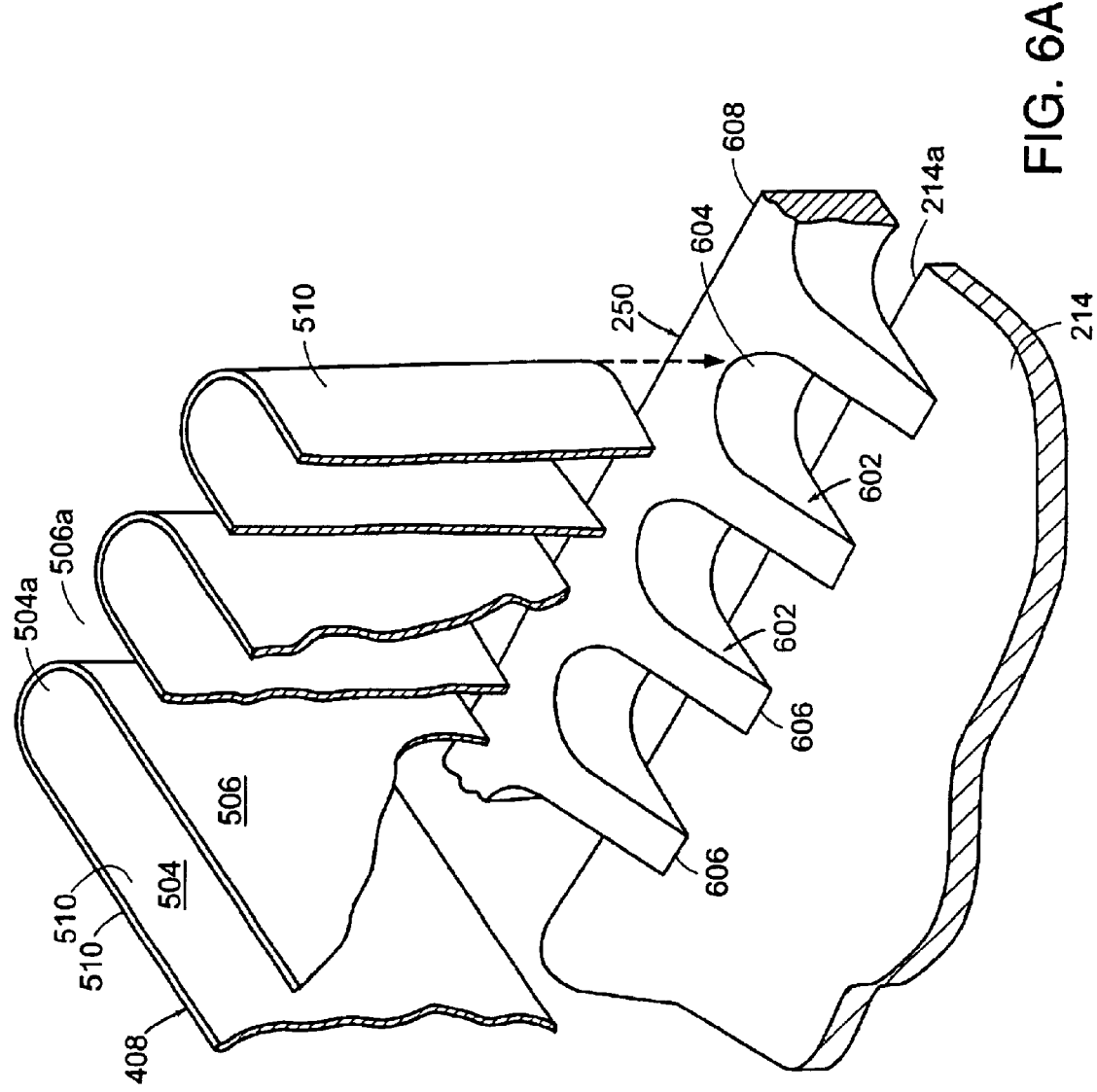

ROTATING HEAT EXCHANGER

CROSS-RELATED APPLICATIONS

This application is related to the following co-pending U.S. Patent Application:

U.S. patent application Ser. No. 09/609,881 entitled, ROTATING FLUID EVAPORATOR AND CONDENSER, filed Jul. 12, 2000, and assigned to the assignee of the present application.

BACKGROUND OF THE INVENTION

1. Field of the Invention

This invention relates to distillation systems and, more specifically, to an improved, highly efficient, rotary evaporator and condenser for use in a vapor compression distiller.

2. Background Information

Distillation is a well-known method for generating potable water from otherwise unsafe water sources (such as sea water or polluted ground water). With distillation, water is heated to boiling, and the resultant vapor (i.e., steam) is collected and condensed, producing distilled water. Many contaminants that are present in the water source are left behind when the water is converted to its vapor phase. Conventional small distillers typically incorporate an electric heating element to boil water in a tank. A condensing coil mounted above the tank collects the vapor and condenses it. The distilled water is then transferred to a holding tank or cell. These boiler-type distillers require substantial amounts of electrical power to produce relatively little distilled water, and are thus highly inefficient and are used to produce only small amounts of distilled water. They are also extremely slow, often taking many hours to produce just a few gallons of distilled water. Accordingly, boiling-type distillers have not gained widespread acceptance or use.

In addition to boiler-type distillers, thin-film distillers have also been proposed. For example, U.S. Pat. No. 4,402, 793 to Petrek et al. titled MULTIPLE EFFECT THIN FILM DISTILLATION SYSTEM AND PROCESS is directed to a solar-powered, thin film distiller. In the distiller of the '793 patent, a plurality of parallel, spaced-apart plates are arranged to face the sun. Water to be distilled is supplied to the tops of the plates and guided to run down the back face of each plate. Sunlight irradiating the first plate's front side heats the plate and causes a portion of the water running down the opposite side to evaporate. The vapor condenses along the front side of the next adjacent plate, transferring heat to the flow of water on its opposite side and so on. Condensate generated along the front sides of the plates is separately collected at the bottoms of the plates.

Vapor compression distillers, which can be more efficient than conventional disis tillers, are also known. The underlying principle of vapor compression distillers is that, by raising the pressure of a vapor (e.g., steam), its saturation temperature also rises. In a vapor compression distiller, vapor produced in an evaporator is removed, compressed (raising its saturation temperature) and supplied to a condenser, where it condenses, producing a distillate. Furthermore, the heat of vaporization that is given off as the vapor (having a raised saturation temperature) condenses is used to heat (and thus evaporate) the liquid being distilled. Large-scale vapor compression distillers using powerfull centrifugal compressors can produce hundreds of gallons of distilled water per hour.

To improve efficiency, rotary evaporators for use in vapor compression distillers have also been designed. For example, U.S. Pat. No. 4,731,159 to Porter et al., entitled EVAPORATOR, is directed to a rotary type evaporator having a plurality of horizontally stacked annular plates that are disposed within a housing and mounted for rotation about a central shaft. The ends of alternating pairs of plates are sealed to define sealed spaces.

Each sealed space includes two inner plate surfaces facing each other and two outer surfaces, each of which is opposite a respective inner surface. The sealed spaces, moreover, are interconnected by a series of orifices and washers disposed between adjacent outer plate surfaces. A liquid to be distilled is introduced into the stack of rotating annular plates and enters each of the sealed spaces through an inlet port. As the liquid enters the spaces, it flows along the opposing inner surfaces of the space. A condensable vapor is introduced into the housing and is thus free to flow around the outer surfaces of the plates. The vapor is not, however, able to enter the sealed spaces.

Since the liquid in the sealed spaces is at a lower temperature than the vapor, the vapor condenses along the outer surfaces of the plates. The condensate is thrown off of the rotating plates, collects inside the housing and is removed through an outlet port located in the bottom of the housing. Condensation of the vapor also transfers heat across the plates to the liquid, thereby causing a portion of the liquid in the sealed spaces to evaporate. The vapor exits the sealed spaces through the liquid inlet ports and is removed from the top of the housing. Any non-evaporated liquid remaining in the spaces flows upwardly along the sealed spaces through the corresponding orifice/washer arrangements and is also withdrawn from the top of the evaporator.

Although it may provide some advantages, the design of the '159 evaporator presents a substantial risk of contamination of the condensate by the liquid being evaporated, and is thus not suitable to generating potable distilled water. In other words, with the evaporator of the '159 patent, the unsafe water which is being distilled could mix with, and thus contaminate, the distillate. For example, a leak at any of the sealed spaces would allow liquid from the sealed space to enter the housing and mix with the distillate being collected therein. The likelihood of such an occurrence, moreover, is not insignificant due to the corrosive attributes of some water sources and the high number of orifices and washers required to provide fluid communication between the various sealed spaces of the evaporator of the '159 patent.

Rotary plate evaporators, such as the evaporator disclosed in the '159 patent, can also be relatively expensive to manufacture, in large part, due to the inefficient use of materials. In particular, the circular plates of rotary evaporators, such as the '159 evaporator, are typically punched out of a rectangular sheet of copper stock. This often produces a significant amount of "waste" copper (i.e., the remaining portions of the rectangular sheet). Although such waste copper can be sold as salvage, the salvage prices for copper are far lower than the original costs. Accordingly, this expense must be reflected in the ultimate price of the distiller.

SUMMARY OF THE INVENTION

Briefly, the invention relates to an evaporator and condenser unit for use in distilling a liquid, such as water. The evaporator and condenser unit includes a rotary heat exchanger plate having a plurality of folds or pleats. In particular, the plate, which is preferably rectangular in its original form, is folded back and forth, accordion-style, and its two ends are joined together so as to provide a generally circular or annular form having an open central space. Adjacent panels of the folded plate define spaces between their oppositely facing surfaces, and these spaces are alternatingly configured as evaporating and condensing chambers. The evaporating chambers, moreover, are defined between adjacent panels that are joined at an outer diameter fold, while the condensing chambers are defined between adjacent panels that are joined at an inner diameter fold. The evaporating chambers are thus closed or sealed at their outer diameter ends and open is at their inner diameter ends, while the condensing chambers are closed or sealed at their inner diameter ends and open at their outer diameter ends. In the illustrative embodiment, a catch basin is wrapped around and spaced slightly from the sealed outer diameter end of the evaporating chambers. The folded, heat exchanger plate is disposed between upper and lower end plates to seal the respective chambers from each other, and within an outer wall. The heat exchanger plate, upper and lower end plates and outer wall are rotatably mounted within a housing having a sump containing the liquid to be distilled.

The lower end plate is configured so that the evaporating chambers are in fluid communication with the sump. A seal ring, which extends around the outer diameter edge of the folded, heat exchanger plate seals the condensing chambers from the sump. A rotating element, which may be part of the outer wall, defines a liquid pick-up channel that extends at least partially into the sump. A first stationary scoop tube extends from the open central space of the folded plate into the liquid pick-up channel. The upper end plate includes at least one condensate port or passageway that is in fluid communication with the condensing chambers. A second stationary scoop tube extends into a condensate collection space located proximate to the upper end plate opposite the folded, heat exchanger plate. An inlet to a compressor is connected to that portion of the housing in fluid communication with the evaporating chambers. An outlet of the compressor is connected to that portion of the housing in fluid communication with the condensing chambers.

In operation, the folded heat exchanger plate is rotated about its axis, causing the rotating element to generate a rotating annular pool of liquid which is forced into the first stationary scoop tube and delivered to the open inner diameter ends of the evaporating chambers. Due to the rotation of the heat exchanger plate, this liquid is accelerated and forced outwardly. The liquid flows along the oppositely facing surfaces of the adjacent panels of the evaporating chambers, and at least a portion of the liquid is evaporated. The vapor flows through the open inner diameter ends of the evaporating chambers and enters the open central space. From the central space, the vapor flows to the compressor inlet. Any remaining, unevaporated liquid collects in the sealed outer edges of the evaporation chambers and drains back to the sump. Compressed vapor is delivered via the compressor outlet to the condensing chambers, where it condenses along the oppositely facing surfaces of the respective panels. Centrifugal force generated by the rotating plate forces the condensate to the outer diameter ends of the condensing chambers. At least some condensate is caught in the catch basins which are wrapped around the sealed outer diameter edges of the evaporation chambers in space-apart relation. The catch basins quickly overflow with condensate and this overflowing condensate is collected on the inner face of the outer wall. The condensate flows upwardly along the outer wall opposite the sump, through the one or more condensate ports and into the condensate collection space. From the condensate collection space, condensate is withdrawn by the second stationary scoop tube.

BRIEF DESCRIPTION OF THE DRAWINGS

The invention description below refers to the accompanying drawings, of which:

FIG. 6A is a partial, isometric view of the outer end of the evaporation and condensation unit;

DETAILED DESCRIPTION OF AN ILLUSTRATIVE EMBODIMENT

Figure 1:
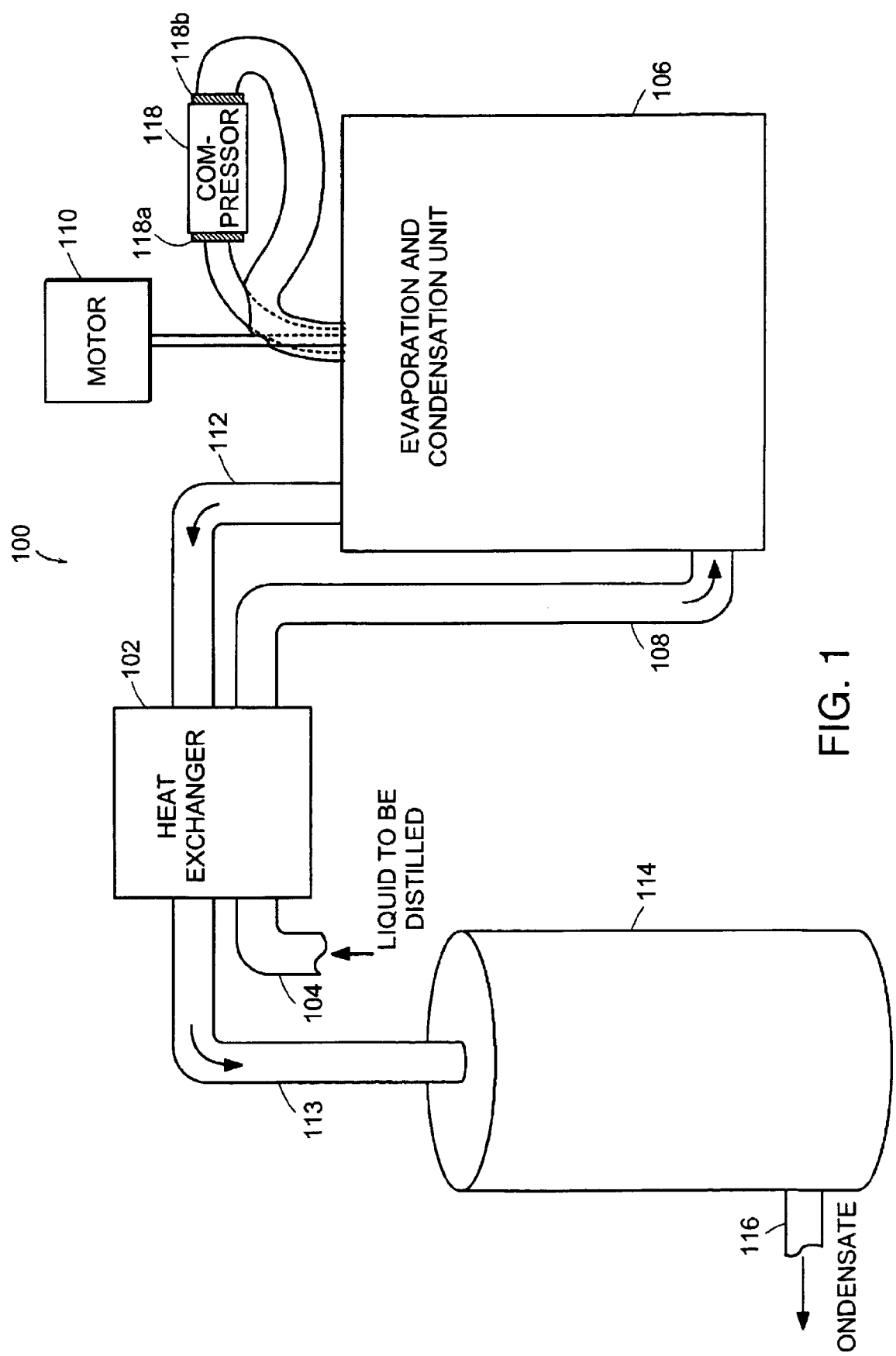
FIG. 1 is a highly schematic diagram of a vapor compression distillation system in accordance with the present invention.

FIG. 1 is a highly schematic diagram of a vapor compression distillation system 100 in accordance with the present invention. Generally, the system 100 comprises a heat exchanger, such as counter-flow heat exchanger 102, for heating a supply of liquid to be distilled, such as non-potable water, which is received by heat exchanger 102 by first pipe 104. Heated liquid is transferred from the counter-flow heat exchanger 102 to an evaporator and condenser unit 106 by a feed line 108. Coupled to the evaporator and condenser unit 106 is a motor 110 for supplying rotary power thereto. An output line 112 transfers a condensate, such as distilled water, from the evaporation and condensation unit 106 back through the heat exchanger 102. Another line 113 transfers the condensate from the heat exchanger 102 to a holding tank 114. Condensate may be withdrawn from the holding tank 114 by pipe 116. System 100 further includes a compressor 118 having an inlet 118$a$ and an outlet 118$b$. The compressor 118 is operably coupled to the evaporator and condenser unit 106, as described herein.

Figure 2:
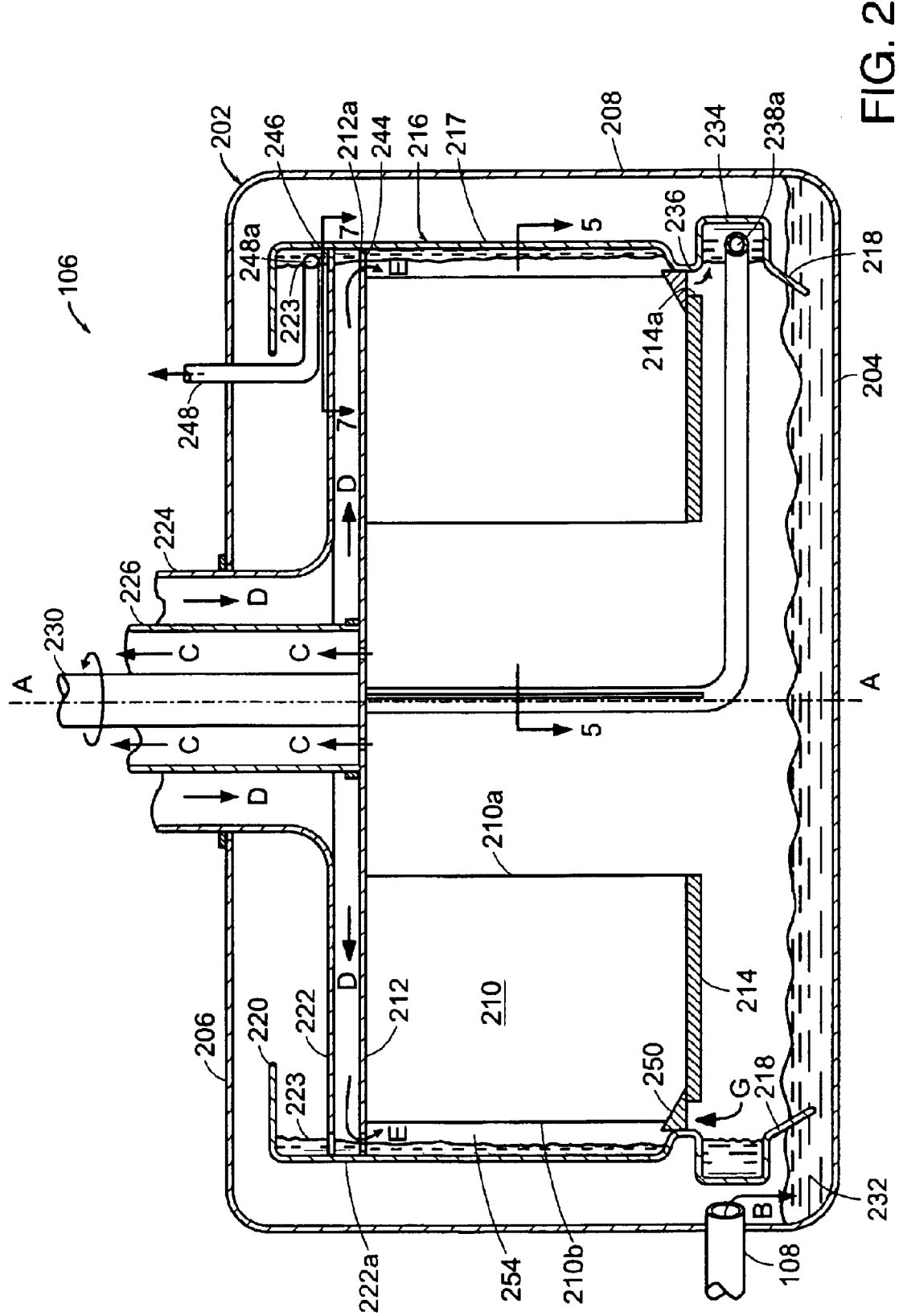
FIG. 2 is a cross-sectional, plan view of the evaporation and condensation unit of FIG. 1.
Figure 3:
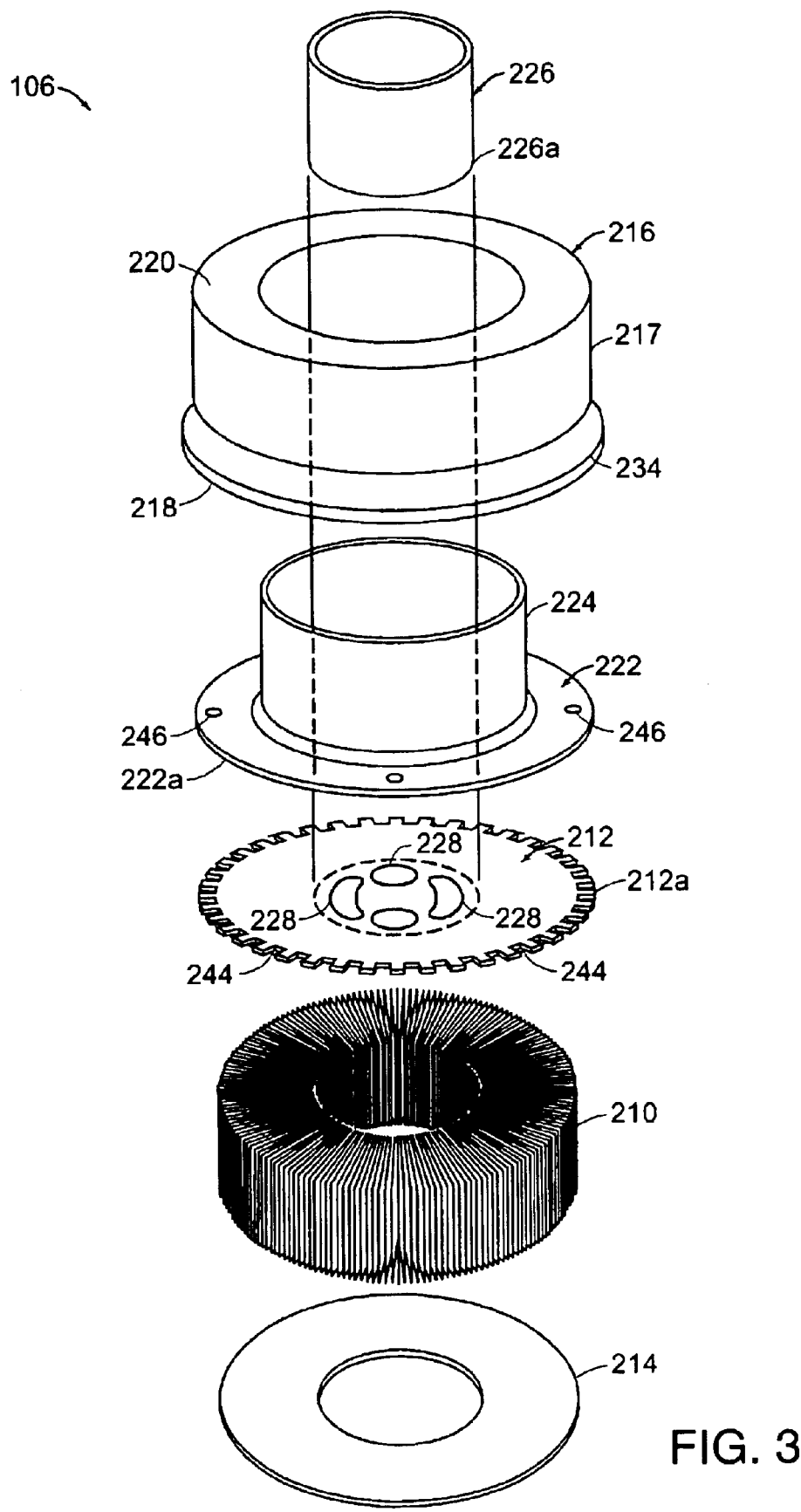
FIG. 3 is a partial, exploded view of the evaporation and condensation unit of FIG. 2.

FIGS. 2 and 3 are a highly schematic, cross-sectional view the evaporator and condenser unit 106, and a partial, exploded view of unit 106, respectively. The unit 106 includes a housing 202 (FIG. 2) having a bottom wall 204, a top wall 206 and a generally cylindrical side wall 208. Disposed within the housing 202 is a heat-exchanger plate 210 having a plurality of folds or pleats that define alternating evaporating and condensing chambers, as described in more detail below. Plate 210 is configured for rotation about a central axis A—A, and includes an inner diameter edge 210$a$ and an outer diameter edge 210$b$ relative to axis A—A. Plate 210 is also mounted between an upper end plate 212 and a lower end plate 214; both of which are substantially perpendicular to axis A—A. Heat exchanger plate 210 as well as the upper and lower end plates 212, 214 are mounted within an outer sleeve 216 that has a side 217 defining a side wall, a lower, open end 218 that is proximate to the housing's bottom wall 204, and an upper end 220 that is proximate to the housing's top wall 206 and partially closed. That is, end 220 defines a shelf or lip. Spaced between and substantially parallel to the upper end plate 212 and the upper end 220 of the sleeve 216 is a circular intermediary wall 222. An outer edge 222*a* of the intermediary wall 222 is preferably sealed against the inner face of the sleeve 216. In the preferred embodiment, intermediary wall 222, specifically its outer edge 222*a*, and the shelf defined by the upper end 220 of sleeve 216 cooperate to form a condensate collection space 223.

Extending from the nominal plane defined by the intermediary wall 222 is a funnel 224. The funnel 224 extends up through the open portion of upper end 220 of the sleeve 216, as well as through the housing's top wall 206. Disposed within the funnel 224, preferably in a concentric arrangement, is a tube-shaped conduit 226 having a first end 226*a* that is sealingly joined to the upper end plate 212. One or more passageways 228 are preferably formed through the upper end plate 212 to allow fluid communication between the evaporating chambers of plate 210 and the inside of the conduit 226. Conduit 226 preferably leads to the compressor inlet 118*a*, while the funnel 224 leads to the compressor outlet 118*b*.

A drive shaft 230 extends from the motor 108 (FIG. 1), down through the conduit 226 and is fixedly attached to the upper end plate 212 by suitable fasteners or mounting elements (not shown). Accordingly, motor 110 can rotate the combination of end plates 212, 214, heat exchanger plate 210, sleeve 216, and intermediary wall 222 about the central axis A—A. A sump 232, which receives a liquid to be distilled from feed line 108, is located within the housing 202 adjacent to the bottom wall 204. Formed near the open end 218 of the sleeve 216 is a rotating element, which, in the preferred embodiment, is a liquid pick-up channel or well 234 having a generally U-shaped cross-section. Adjacent to the liquid pick-up channel 234 is an inward bend 236 in the sleeve 216. The inward bend 236 is spaced slightly from an outer edge 214*a* of the lower end plate 214, thereby defining a gap "G" between them.

Unit 106 further includes a first stationary scoop tube 238 having an open end 238*a* that preferably faces opposite to the direction of rotation of the rotating plate 210. The tube's open end 238*a* is disposed in the U-shaped channel 234 formed by the sleeve 216. A section 238*b* of the tube 238 opposite the open end 238*a* extends up along the inner diameter edge 210*a* of the heat exchanger plate 210 substantially parallel to and/or along axis A—A. Formed along this section 238*b* is a slot 240.

One or more fluid ports 244 are preferably formed near an outer edge 212*a* of the upper end plate. As shown in FIG. 3, the outer edge 212*a* of plate 212 may have a series of spaced-apart teeth, and the spaces between adjacent teeth define the ports 244. One or more condensate ports 246 are also formed near the outer edge 222*a* of the intermediary plate 222. A second stationary scoop tube 248 preferably extends through the housing's top wall 206, through the open portion of upper end 220 of the sleeve 216 and into the condensate collection space 223. Second stationary scoop tube 248 has an opening 248*a* disposed in space 223, which also faces opposite to the direction of rotation of the heat exchanger plate 210. Second stationary scoop tube 248 is connected to the output line 112 (FIG. 1).

Unit 106 further includes a seal ring 250 (FIG. 2) that wraps around the outer diameter edge 210*b* of plate 210 near lower end plate 214 and seals the condensing chambers from both the evaporating chambers and the sump 232. The seal ring 250 is preferably sealingly attached to the upper surface of bottom end plate 214 and to the inner face of sleeve 216 at the inward bend 236.

The folded heat exchanger plate 210, upper end plate 212, lower end plate 214, and seal ring 250 cooperate to define two spaces within housing 202. An evaporated vapor space 252 generally consists of the space inboard of the inner diameter edge 210*a* of plate 210, and below lower end plate 214. The evaporated vapor space 252 is in fluid communication with the compressor inlet 118*a* (FIG. 1) via passageways 228. Space 252 is also in fluid communication with the evaporating chambers. A compressed vapor space 254 generally consists of the space outboard of the outer diameter edge 210*b* of plate 210, and inboard of sleeve 216. The compressed vapor space 254 is in fluid communication with the compressor outlet 118*b* and with the condensing chambers, as described below. As mentioned above, the evaporated vapor space 252 and the compressed vapor space 254 are segregated (i.e., sealed) from each other, primarily by the heat exchanger plate 210, the upper and lower end plates 212, 214, and the seal ring 250.

It should be understood that motor 110 and/or compressor 118 may be located at other convenient locations. For example, the motor 110 and/or the compressor 118 may be located within the housing 202 to conserve space, among other benefits.

Figure 4:
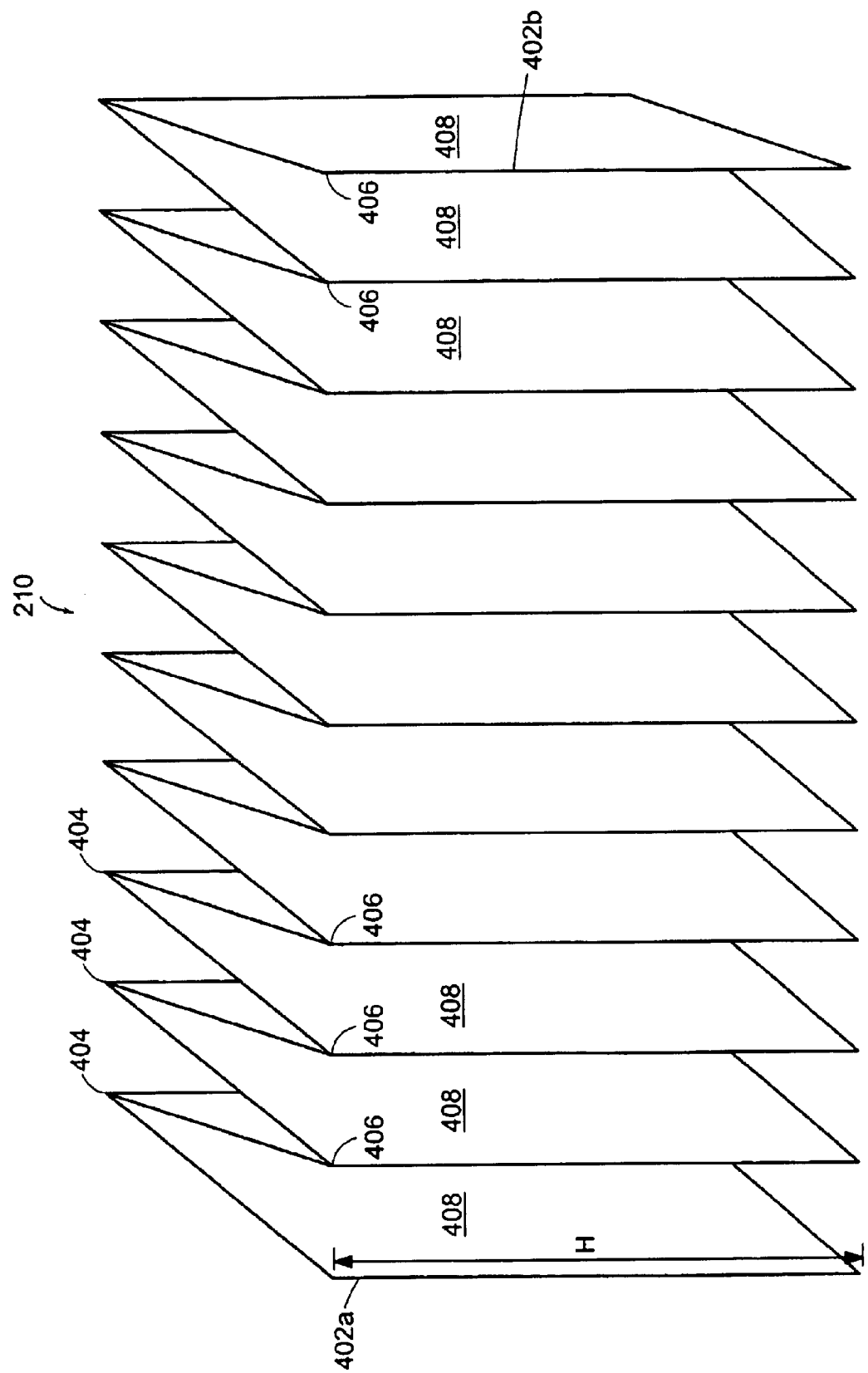
FIG. 4 is an isometric view of a heat exchanger plate in accordance with the present invention.

FIG. 4 is an isometric view of the heat exchanger plate 210 in unassembled form. Plate 210 is preferably formed from a single, rectangular piece of stock having two opposing ends 402*a*, 402*b*. The plate 210 is folded back-and-forth, accordion-style, so as to define a plurality of alternating folds or pleats 404, 406. Between each pair of sequential folds 404, 406 is a substantially planar panel 408 of the plate 210. The two opposing ends 402*a*, 402*b* of the plate 210 are joined together so as to give plate 210 a cylindrical or annular form, having an open center.

In the preferred embodiment, plate 210 is formed from approximately 0.008 inch metal sheet stock having sufficiently high thermal conductivity, such as copper, stainless steel, etc. When folded and formed into an annular shape, plate 210 has an inside diameter of approximately 5 inches and an outside diameter of approximately 12 inches. Since the heat exchanger plate 210 of the present invention can be formed from a single rectangular piece of material, such as copper, there is little or no waste material generated during its manufacture. That is, unlike the prior art heat exchanger plates, plate 210 is not formed from punching forms out of copper stock. Accordingly, the evaporator and condenser unit 106 of the present invention can be more economically produced than prior art units.

Those skilled in the art will understand that other sheet metal stock and plate dimensions may be used depending on the desired condensate flow rate of the system 100 (FIG. 1).

The two ends 402*a*, 402*b* of plate 210 are preferably welded or braised together.

The upper and lower end plates 212, 214, which may also be formed from copper stock, may be soldered or braised to the heat exchanger plate 210.

It should be understood that plate 210 may be formed from two or more pieces.

Ports 244 combine to have a cross-sectional area on the order of two to ten square inches, while condensate ports 246 combine to have a cross-sectional area on the order of a fraction of a square inch. Passageways 228 similarly combine to have a cross-sectional areas on the order of two to ten square inches. Nonetheless, those skilled in the art will recognize that other sizes may be employed.

Figure 5A:
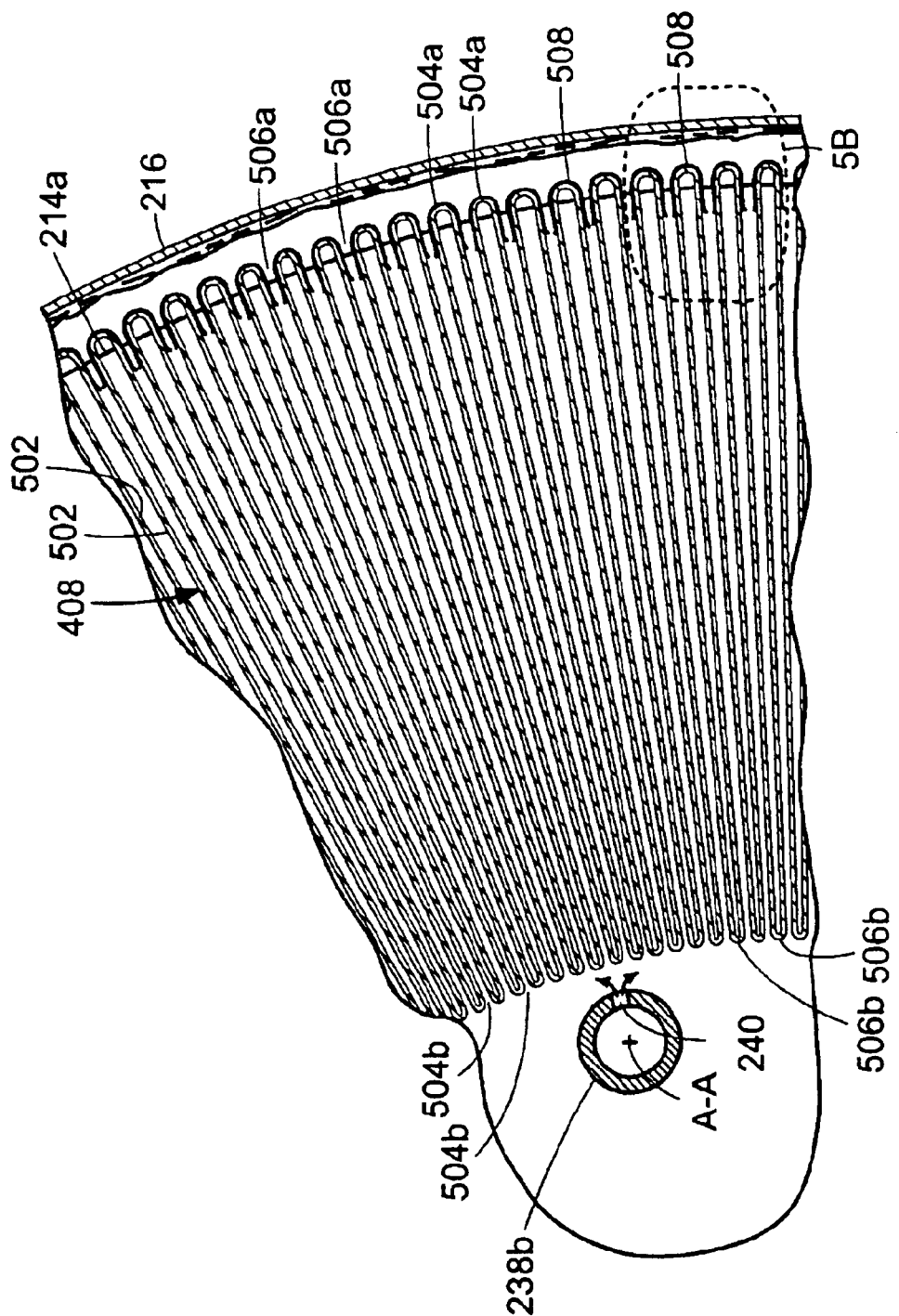
FIG. 5A is a partial, top view of the evaporation and condensation unit of FIG. 2 along lines 5—5.
Figure 5B:
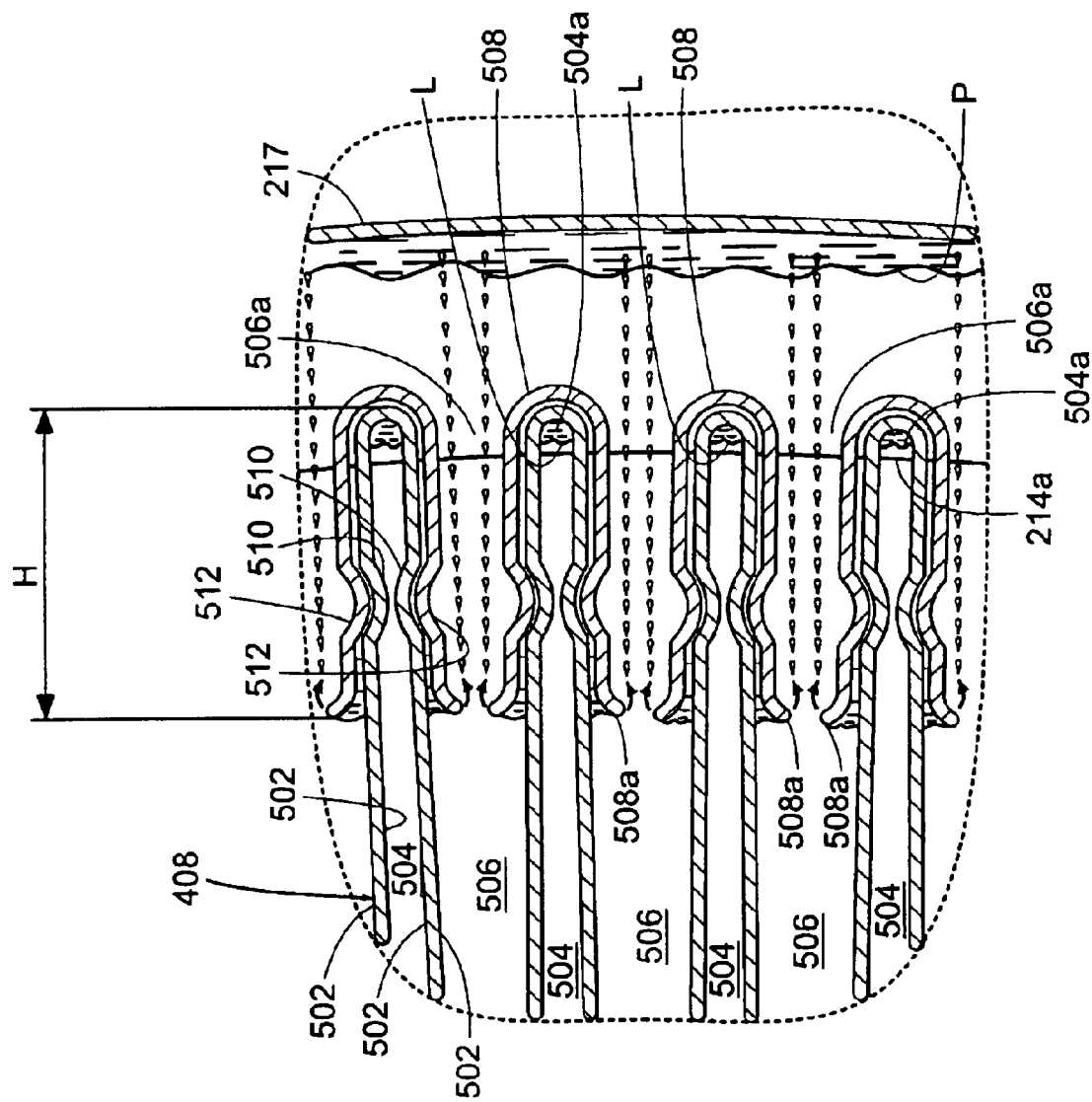
FIG. 5B is a portion of the outer end of the evaporation and condensation unit of FIG. 5A in greater detail.

FIG. 5A is a partial, cross-sectional view of unit 106 along line 5—5 (FIG. 2) and FIG. 5B is a detail from FIG. 5A. As shown, each panel 408 of plate 210 defines two plate surfaces 502, and the oppositely facing surfaces 502 of adjacent panels 408 define spaces therebetween. As indicated above, these spaces are alternately configured as evaporating chambers 504 (FIG. 5B) and condensing chambers 506 (FIG. 5B). By virtue of the outer folds 406 (FIG. 4) relative to axis A—A, the evaporating chambers 504 are closed or sealed at their outer diameter ends 504a, and open at their inner diameter ends 504b (FIG. 5A). The condensing chambers 506, in contrast, are open at their outer diameter ends 506a, and closed or sealed at their inner diameter ends 506b (FIG. 5A). The outer diameter ends 504a of the evaporating chambers 504 preferably extend beyond the outer edge 214a of lower end plate 214, thereby providing a flow path from each evaporating chamber 504 to the sump 232 (FIG. 1). The terms "inner" and "outer" as used herein are in reference to axis A—A, i.e., inner being closer to axis A—A and outer being further from axis A—A.

In accordance with the preferred embodiment of the present invention, a catch basin 508 (FIG. 5B) preferably surrounds the sealed outer diameter end 504a of each evaporating chamber 504. Each catch basin 508 is preferably shaped to have substantially the same contour or shape as its respective outer diameter end 504a and is spaced slightly apart therefrom. Each catch basin 508 is also open at its inner edge 508a relative to axis A—A, and the opening defined by inner edge 508a is spaced some distance "H" (FIG. 5B) from the evaporating chamber's sealed outer end 504a. The catch basins 508 may be snap-fitted onto the ends of the evaporating chambers 508. In particular, dimples 510 may be formed in the panels 408 forming the condensing chambers 506 near the outer diameter ends 506a, and matching humps 512 may be formed on the catch basins 508. During assembly, each basin 508 is slid over its associated evaporating chamber 504 until the humps 512 snap into their respective dimples 510.

Figure 6B:
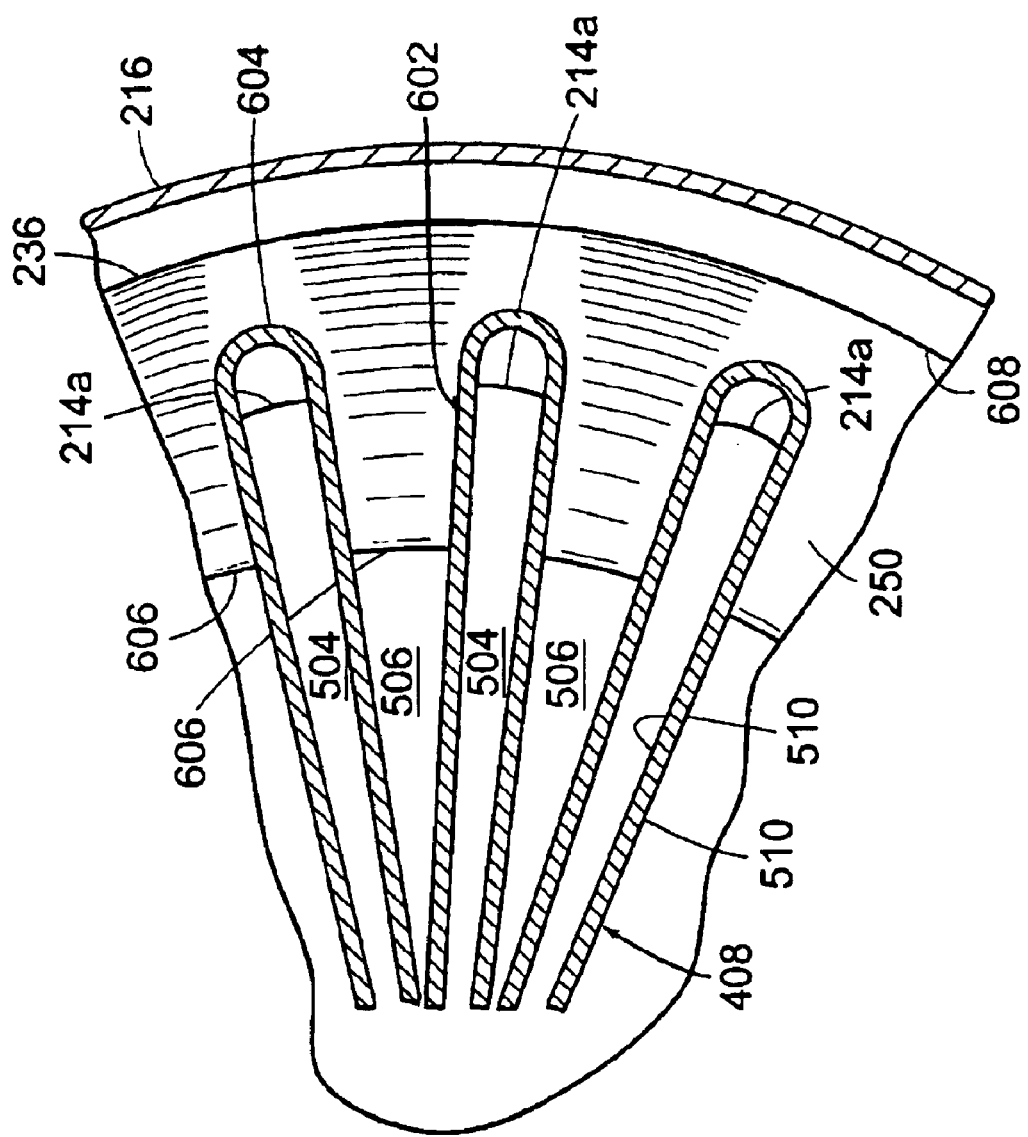
FIG. 6B is a partial, top view of the outer end of the evaporation and condensation unit.

FIG. 6A is a partial, exploded, isometric view of the outer diameter ends 504a, 506a of several evaporating and condensing chambers 504, 506 illustrating the sealing ring 250 in greater detail. FIG. 6B is a top view of the evaporating and condensing chambers 504, 506 of FIG. 6A. The catch basins 508 have been removed for clarity. As shown, the sealing ring 250 includes a plurality of recesses 602 each configured to receive the sealed outer end 504a of a respective one of the evaporating chambers 504. Each recess 602, moreover, has a well 604 that is positioned beyond the outer edge 214a of the lower end plate 214 relative to axis A—A. Between each recess 602 is a finger 606 that extends in a radial inward direction along the top of the lower end plate 214. Sealing ring 250 further includes a back wall 608. Upon assembly, the back wall 608 of the sealing ring 250 is sealed against the inward bend 236 (FIG. 6B) of sleeve 216, recesses 602 are sealed around the outer diameter ends 504a of the evaporating chambers 504, and fingers 606 are sealed against the top surface of bottom end wall 214. Thus, even though the outer diameter ends 504a, 506b of both the evaporating chambers 504 and the condensing chambers 506 extend radially outward beyond the outer edge 214a of lower end plate 214, the sealing ring 250 seals the condensing chambers 506, but not the evaporating chambers 504, from the sump 232, as best shown in FIG. 6B.

The sealing ring 250 may be formed from rubber or epoxy that is bonded into place or from metal that is soldered or braised into place.

In operation, motor 110 (FIG. 1) is activated, thereby rotating shaft 230 (FIG. 2), which, in turn, rotates the heat exchanger plate 210, upper and lower end plates 212, 214, sleeve 216 and intermediary wall 222. A conventional speed reducer, such as a belt or gear transmission (not shown), is preferably employed so that the rotational speed of these components is approximately 700 rpm, although other rotational speeds may be used. Liquid to be distilled, such as non-potable water, passes through counter-flow heat exchanger 102, where it is heated approximately to its boiling point and flows through inlet pipe 108 into the sump 232 of the evaporator and condenser unit 106 as shown by arrow B (FIG. 2). The liquid may be further heated to near its boiling point before and/or within the sump 232 by an electric or other type of heater. Compressor 118 is also activated, thereby drawing any vapor from the evaporated vapor space 252, through passageways 228, along conduit 226 and into the compressor's inlet 118a, as shown by arrows labeled C (FIG. 2).

Compressed vapor is fed from outlet 118b to funnel 224 and flows along the space defined between the upper end plate 212 and the intermediary wall 222, as shown by arrows labeled D (FIG. 2). The compressed vapor flows through the ports 244 of the upper end plate 212, as shown by arrows labeled E, and enters the condensing chambers 506. Rotation of sleeve 216 causes liquid along sloped open end 218 to be drawn up from the sump 232 and delivered into the channel 234. With its open end 238a disposed below the surface of the liquid in the channel 234 and open opposite to the direction of rotation, the first stationary scoop tube 238 picks up a volume of liquid and passes it to section 238b. The liquid flows from section 238b, out through slot 240 and into the evaporating chambers 504, which are open at their inner diameter ends 504b (FIG. 5A). Because the condensing chambers 506 are sealed at their inner diameter ends 506b, liquid exiting the first stationary scoop tube 238 does not enter them.

The centrifugal force generated within the rotating plate 210 forces at least some of the liquid being discharged from slot 240 to flow along each of the oppositely facing plate surfaces 502 of the evaporating chambers 504. As the liquid flows along the evaporating chambers 504, heat from the adjacent condensing chambers 506 causes some portion of this liquid to evaporate and form a vapor or gas. Because the evaporating chambers 504 are sealed at their outer diameter ends 504a, the vapor flows radially inward and enters the central space 252. Any remaining liquid (i.e., liquid that was not converted to vapor) is trapped at the sealed outer diameter ends 504a of the evaporating chambers 504 where it may collect in pools L (FIG. 5B). As shown in FIGS. 2 and 5B, the sealed outer diameter ends 504a of the evaporating chambers 504 are specifically configured to extend radially outward beyond the outer edge 214a of the lower end plate 214. In this way, unevaporated liquid from pools L can drain down through evaporating chambers 504, though gap G and back into the sump 232.

As indicated above, operation of the compressor 118 causes the vapor formed in the evaporating chambers 504 and discharged into space 252 to be drawn through the passageways 228 of upper end plate 212, through conduit 226 and into the compressor inlet 118a. The vapor is then compressed raising its temperature and pressure. Compressed vapor is delivered from outlet 118b to the funnel 224. The compressed vapor flows through the ports 244 of the upper end plate 212 and enters the condensing chambers 506.

Figure 7:
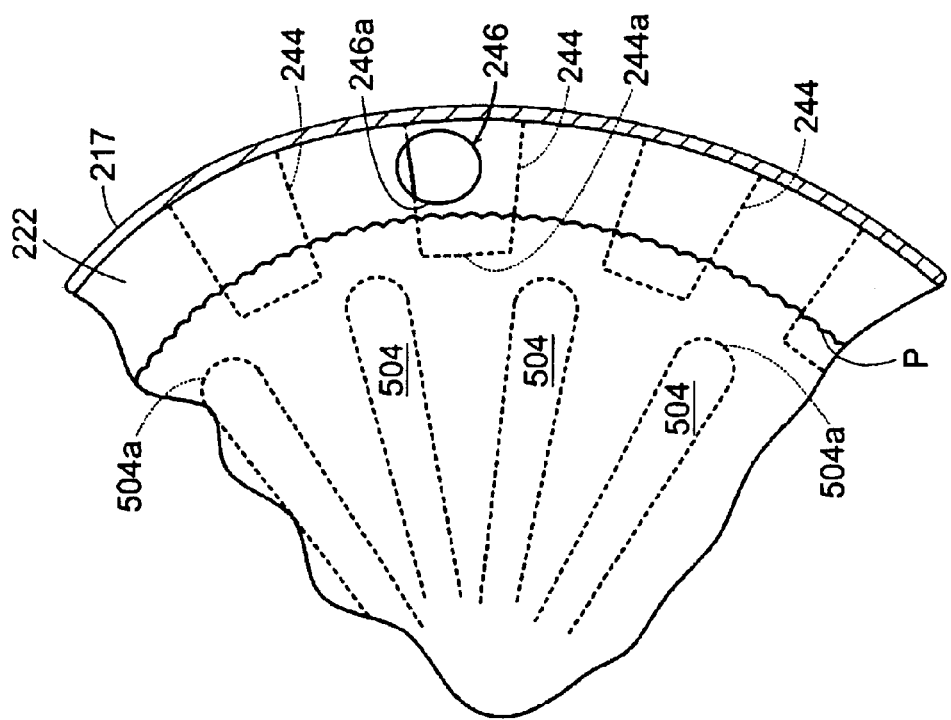
FIG. 7 is a partial, top view of the evaporation and condensation unit showing the fluid ports in greater detail.

FIG. 7 is a partial, top view of unit 106 along lines 7—7 (FIG. 2) showing a preferred arrangement of ports 244 and 246. As shown, a radially inboard portion 244a of ports 244 is closer to axis A—A than a radially inboard portion 246a of condensate ports 246. Nonetheless, upper end plate 212 completely covers the evaporating chambers 504 along their entire radial lengths, thereby preventing compressed vapor from entering chambers 504.

In the preferred embodiment, the counter-flow heat exchanger 102 (FIG. 1) and compressor 118 are set to provide a pressure differential of approximately 1.0 pound per square inch (psi) and a temperature differential of approximately 3° Fahrenheit (F.) between the evaporating and condensing chambers 504, 506 during steady state operation of unit 106.

As best illustrated in FIG. 5B, as the liquid flowing along the panel surfaces 502 in the adjacent evaporating chambers 504, it vaporizes, e.g., evaporates, at a lower temperature (e.g., 212° F.) than the compressed vapor (e.g., 215° F. saturation temperature), which is condensing along the opposing panel surfaces 502 within the respective condensing chambers 506. At least some of this condensate is forced along the panel surfaces 502 of the condensing chambers 506 toward the outer diameter ends 506a by the centrifugal force generated through rotation of the plate 210. The condensate enters and fills the space between the catch basins 508 and the sealed outer diameter ends 504a of the evaporating chambers 504. Once the condensate completely fills this space, additional condensate will spill over the inner edges or lips 508a of the catch basins 508 and will be caught by the inner surface of sleeve 216.

The condensate, which is constantly seeking out a lower level (relative to axis A—A), reaches and eventually flows through the ports 244 in the upper end plate 212, through ports 246 of intermediary wall 222, and into the condensate collection space 223 (FIG. 2). Here, condensate is removed by the second stationary scoop tube 248. More specifically, the build-up of condensate in the collection space 223 will eventually reach the scoop tube opening 248a, at which point condensate will be forced into the second scoop tube 248 and removed from the evaporator and condenser unit 106. By constantly removing condensate from the collection space 223, a flow pattern is established up along the inner face of sleeve 216 away from the sump 232, through the ports 244 and 246, and into the condensate collection space 223.

As best shown in FIG. 7, condensate ports 246 are preferably positioned and sized to prevent compressed vapor from flowing through the condensate ports 246 and entering space 223. Specifically, ports 246 are preferably positioned radially outward from ports 244 such that ports 246 completely fill with condensate during steady state operation, thereby blocking the flow of compressed vapor. That is, ports 246 are "below", i.e., radially outboard of, the surface of the condensate pool, designated generally P, that forms along side wall 217.

As shown, the novel fluid flow patterns established with the present invention reduce the risk of contamination of the condensate. In particular, condensate is preferably drawn out of the unit 106 opposite the sump 224, thereby reducing the chance that "dirty" liquid from the sump 224 will contaminate the condensate. Additionally, any leaks in the higher pressure condensing chambers 506 will only result in condensate entering the lower pressure evaporating chambers 504. Furthermore, the height H of the catch basins 508 causes a column of condensate of height H to form between the sealed outer end 504a of evaporating chambers 504 and the catch basins 508. This column of condensate, which is preferably maintained during operation of unit 106, generates a pressure head relative to the pools L of unevaporated liquid that collect in the sealed outer ends 504a of evaporating chambers 504. Should a leak form in the sealed outer end 504a of an evaporating chamber 504, this pressure head would block any dirty water from mixing with condensate. Instead, the existence of this pressure head forces condensate from the catch basin 508 into the evaporating chamber 504. Although this would reduce the system's efficiency, it ensures that the condensate is not compromised by dirty water.

It should be understood that unit 106 preferably includes one or more de-gasser components (not shown) for removing air and other gases from the housing 202. It should be further understood that the panel surfaces 502 in the evaporating chamber 504 may be made hydrophilic, while the panel surfaces 502 in the condensing chambers 506 may be made hydrophobic by suitable, well-known techniques.

It should be further understood that the catch basins 508 may be formed from a single piece of material or from some number less than the number of evaporating chambers 504. That is, adjacent catch basins 508 may be joined together at their inner edges or lips 508a such that the catch basins may have the appearance of a bushing with a corrugated cross-section. In this embodiment, drain holes are preferably provided between one or more pairs of adjacent catch basins 508 to permit condensate to pass therethrough and be caught against the inner face of sleeve 216.

Alternatively, the evaporator and condenser unit 106 may include no catch basins at all.

It should also be understood that other mechanisms besides seal ring 250 may be employed to provide fluid communication between the evaporating chambers 504 and sump 232, while sealing the condensing chambers 506 from the sump 232.

As described herein, each fold 404, 406 of heat exchanger plate 210 is preferably co-planar with the axis of rotation A—A. The lines defined by the folds, for example, may be parallel to the axis of rotation A—A, as shown in FIG. 3, or they may intersect the axis A—A at some imaginary point above or below the sump 224. In other words, the plate 210 may have a truncated cone (or simple cone) shape rather than a cylindrical or annular shape. The larger diameter end of the truncated cone, moreover, may be located either proximate to or away from the sump 224. Those skilled in the art will recognize that other generally circular shapes may also be employed.

Those skilled in the art will recognize that other liquid pick-up mechanisms be sides a stationary scoop tube 238 may be employed. For example, a rotating scoop tube that extends into sump 232, could be mounted to lower end plate 214 or to some other rotating component.

It should also be understood that channel 234 may be replaced with a wall at least a portion of which is sloped to picked up liquid.

Furthermore, slot 240 may be replaced and/or combined with one or more holes or nozzles formed in the tube 238 to deliver liquid to the evaporating chambers 504.

In a preferred embodiment, unit 106 may not include a sump at all. Instead, feed line 108 may deliver liquid directly onto the sloped open end 218 of sleeve 216, thereby providing feed into channel or well 234, as described in commonly owned, co-pending U.S. patent application Ser. No. 09/765,263, filed Jan. 18, 2001, for a *Distiller Employing Cyclic Evaporation-Surface Wetting*, which is hereby incorporated by reference in its entirety. In this case, unevaporated liquid may collect in channel 234, mix with liquid from feed line 108 and be removed by tube 238.

It should also be understood that the source of vapor for the condensing chambers need not come from the evaporation chambers. For example, the evaporator and condenser unit 106 could be configured to receive steam from some external source and to supply this steam to the condensing chambers. In addition, a different fluid, such as alcohol, may be used in the evaporating chambers as compared to the fluid used in the condensing chambers. It is also not necessary that the vapor supplied to the condensing chambers be compressed.

The foregoing description has been directed to specific embodiments of this invention. It will be apparent, however, that other variations and modifications may be made to the described embodiments, with the attainment of some or all of their advantages. For example, the evaporation and condensation unit 106 may alternatively represent one effect of a multi-effect, thermally driven system. In this case, the compressor could be eliminated. In a thermally driven system, liquid in the sump 232 may be heated to the desired temperature by sources other than counter-flow heat exchanger 102, such as a stove top burner, solar energy, etc. In another embodiment, the condensing chambers 506 of unit 106 could be coupled to a steam source. This steam source may constitute waste steam from a space heating system. In addition, other liquids besides water may be distilled with the system 100 of the present invention. Therefore, it is the object of the appended claims to cover all such variations and modifications as come within the true spirit and scope of the invention.

What is claimed is:

1. An evaporator and condenser unit for use in distilling a liquid, the evaporator and condenser unit comprising:
   a housing having an inlet, an outlet, and a lower portion defining a sump for containing the liquid to be distilled;
   a heat exchanger plate disposed within the housing and configured for rotation about an axis, the heat exchanger plate having a plurality of folds and two opposing edges that are joined together so as to give the folded plate a generally circular shape, the folds defining a plurality of spaced-apart panels having corresponding surfaces that define alternating evaporating and condensing chambers between opposing panel surfaces;
   an upper end plate and a lower end plate disposed within the housing substantially perpendicular to the axis of rotation;
   a liquid-pick-up mechanism configured to draw liquid from the sump and deliver it to the inner edges of the evaporating chambers;
   a sleeve enclosing the folded heat exchanger plate at least at its outer edges, the sleeve defining a condensate collection space proximate to the folded heat exchanger plate opposite the sump, and
   at least one stationary scoop tube extending through the housing and into the condensate collection space, the at least one stationary scoop tube having an opening in the condensate collection space, wherein;
   the folded heat exchanger plate is mounted between the upper and lower end plates so as to seal the evaporating chambers from the condensing chambers,
   the evaporating and condensing chambers include inner and outer edges relative to the axis of rotation,
   the evaporating chambers are closed at their outer edges by corresponding folds in the heat exchanger plate, are open at their inner edges, and are in fluid communication with the outlet so as to provide vapor thereto,
   the condensing chambers are open at their outer edges, are closed at their inner edges by corresponding folds in the heat exchanger plate, and are in fluid communication with the inlet so as to receive vapor therefrom;
   the upper end plate has one or more ports disposed proximate to an outer diameter edge of the upper end plate, the one or more ports providing fluid communication between the condensing chambers and the condensate collection space, and
   the at least one stationary scoop tube is configured to remove condensate that collects in the condensate collection space.

2. The evaporator and condenser unit of claim 1 wherein the folds of the heat exchanger plate are substantially co-planar with the axis of rotation.

3. An evaporator and condenser unit for use in distilling a liquid, the evaporator and condenser unit comprising:
   a housing having an inlet, an outlet, and a lower portion defining a sump for containing the liquid to be distilled;
   a heat exchanger plate disposed within the housing and configured for rotation about an axis, the heat exchanger plate having a plurality of folds and two opposing edges that are joined together so as to give the folded plate a generally circular shape, the folds defining a plurality of spaced-apart panels having corresponding surfaces that define alternating evaporating and condensing chambers between opposing panel surfaces;
   an upper end plate and a lower end plate disposed within the housing substantially perpendicular to the axis of rotation;
   a liquid pick-up mechanism configured to draw liquid from the sump and deliver it to the inner edges of the evaporating chambers;
   a sleeve enclosing the folded heat exchanger plate at least at its outer edges, the sleeve defining a side wall facing the axis of rotation, the sleeve configured such that the side wall traps condensate generated within the condensing chambers; and
   a seal ring extending around the outer end of the folded heat exchanger plate between the lower end plate and the sleeve, the seal ring configured to permit fluid communication between the evaporating chambers and the sump, but blocking fluid communication between the condensing chambers and the sump, wherein:
   the folded heat exchanger plate is mounted between the upper and lower end plates so as to seal the evaporating chambers front the condensing chambers,
   the evaporating and condensing chambers include inner and outer edges relative to the axis of rotation,
   the evaporating chambers are closed at their outer edges by corresponding folds in the heat exchanger plate, are open at their inner edges, and are in fluid communication with the outlet so as to provide vapor thereto, and
   the condensing chambers are open at their outer edges, are closed at their inner edges by corresponding folds in the heat exchanger plate, and are in fluid communication with the inlet so as to receive vapor therefrom.

4. The evaporator and condenser unit of claim 3 further comprising a catch basin disposed in spaced-apart relation about the sealed outer edge of at least one evaporating chamber, the catch basin extending radially inward relative to the axis of rotation a selected distance, and being open in the direction of the axis of rotation.

5. The evaporator and condenser unit of claim 4 wherein a catch basin is disposed about the sealed outer edge of each evaporating chamber.

6. The evaporator and condenser unit of claim 3 wherein the folds of the heat exchanger plate are substantially co-planar with the axis of rotation.

7. An evaporator and condenser unit for use in distilling a liquid, the evaporator and condenser unit comprising:
   a housing having an inlet, an outlet, and a lower portion defining a sump for containing the liquid to be distilled;
   a heat exchanger plate disposed within the housing and configured for rotation about an axis, the heat exchanger plate having a plurality of folds and two opposing edges that are joined together so as to give the folded plate a generally circular shape, the folds defining a plurality of spaced-apart panels having corresponding surfaces that define alternating evaporating and condensing chambers between opposing panel surfaces,
   an upper end plate and a lower end plate disposed within the housing substantially perpendicular to the axis of rotation; and
   a liquid pick-up mechanism configured to draw liquid from the sump and deliver it to the inner edges of the evaporating chambers, wherein
      the folded heat exchanger plate is mounted between the upper and lower end plates so as to seal the evaporating chambers from the condensing chambers,
      the evaporating and condensing chambers include inner and outer edges relative to the axis of rotation,
      the evaporating chambers are closed at their outer edges by corresponding folds in the heat exchanger plate, are open at their inner edges, and are in fluid communication with the outlet so as to provide vapor thereto, and
      the condensing chambers are open at their outer edges, are closed at their inner edges by corresponding folds in the heat exchanger plate, and are in fluid communication with the inlet so as to receive vapor therefrom.

8. The evaporator and condenser unit of claim 7 wherein the folds of the heat exchanger plate are substantially co-planar with the axis of rotation.

9. An evaporator and condenser unit for use in distilling a liquid, the evaporator and condenser unit comprising:
   a housing having an inlet, an outlet, and a lower portion defining a sump for containing the liquid to be distilled;
   a heat exchanger plate disposed within the housing and configured for rotation about an axis, the heat exchanger plate having a plurality of folds and two opposing edges that are joined together so as to give the folded plate a generally circular shape, the folds defining a plurality of spaced-apart panels having corresponding surfaces that define alternating evaporating and condensing chambers between opposing panel surfaces;
   an upper end plate and a lower end plate disposed within the housing substantially perpendicular to the axis of rotation;
   a rotating element extending at least partially within the sump and including a wall configured to pick-up liquid from the sump; and
   a first stationary scoop tube having an open end disposed near the wall of the rotating element and a section disposed proximate to the inner edges of the folded heat exchanger plate, the section having means for discharging liquid from the sump, wherein;
      the folded heat exchanger plate is mounted between the upper and lower end plates so as to seal the evaporating chambers from the condensing chambers,
      the evaporating and condensing chambers include inner and outer edges relative to the axis of rotation,
      the evaporating chambers are closed at their outer edges by corresponding folds in the heat exchanger plate, are open at their inner edges, and are in fluid communication with the outlet so as to provide vapor thereto, and
      the condensing chambers are open at their outer edges, are closed at their inner edges by corresponding folds in the heat exchanger plate, and are in fluid communication with the inlet so as to receive vapor therefrom.

10. The evaporator and condenser unit of claim 9 wherein the section of the tube extends substantially along the axis of rotation and the means for discharging liquid is configured such that liquid enters the evaporating chambers which are open at their inner edges.

11. The evaporator and condenser unit of claim 9 wherein the folds of the heat exchanger plate are substantially co-planar with the axis of rotation.

* * * * *